US006273292B1

(12) United States Patent
Milan

(10) Patent No.: US 6,273,292 B1
(45) Date of Patent: Aug. 14, 2001

(54) DISPENSING MACHINE AND METHOD OF DISPENSING A BLENDED FRUIT BEVERAGE

(76) Inventor: Michael Milan, 12335 Santa Monica Blvd., #342, Los Angeles, CA (US) 90025

( * ) Notice: Subject to any disclaimer, the term of this patent is extended or adjusted under 35 U.S.C. 154(b) by 0 days.

(21) Appl. No.: 09/472,309

(22) Filed: Dec. 27, 1999

(51) Int. Cl.[7] .................................................... B65G 59/00

(52) U.S. Cl. ............................................ 221/1; 221/150 R

(58) Field of Search .................................... 221/1, 150 R, 221/150 HC, 69, 82, 9, 13, 92, 191; 62/369

(56) References Cited

U.S. PATENT DOCUMENTS 6,090,426 * 7/2000 Vincent ................................ 426/515

* cited by examiner

*Primary Examiner*—Kenneth W. Noland

(74) *Attorney, Agent, or Firm*—Jack C. Munro

(57) ABSTRACT

A smoothie dispensing machine and a method of dispensing a beverage container which utilizes an enclosed housing within which there is an internal chamber. A quantity of sealed smoothie containing beverage containers are located within the internal chamber. Upon selection of a single type of smoothie beverage container to be dispensed, that container is dispensed into a collection chamber. Within the collection chamber the temperature of the dispensed container is quickly lowered to less than thirty-two degrees fahrenheit and at the same time is rapidly shaken. At the end of the cooling and shaking period, the beverage container is dispensed to a location which is accessible exteriorly of the housing for removing of the container so that the container can be opened and the contents consumed.

11 Claims, 2 Drawing Sheets

DISPENSING MACHINE AND METHOD OF DISPENSING A BLENDED FRUIT BEVERAGE

BACKGROUND OF THE INVENTION

1) Field of the Invention

The field of this invention relates to dispensing apparatuses and more particularly to a machine that is designed to dispense beverage containers that contain a non-carbonated, fruit drink that is blended with ice crystals.

2) Description of the Prior Art

Dispensing machines for beverage containers, such as cans and bottles, have long been known. A typical type of dispensed beverage container is a container that contains a carbonated drink. A typical dispensing apparatus requires a user to insert money into the dispensing apparatus, make an appropriate selection of a type of beverage container that is to be selected from a grouping of different types of beverage containers, and this selected beverage container is then dispensed to a location which is accessible exteriorly of the apparatus so that the dispensed container can be removed from the apparatus unsealed and the contents consumed.

Within recent years, there has been another form of beverage that is experiencing a reasonable degree of acceptance by the population. This form of beverage is a fruit juice or fruit drink that is blended with crushed ice. If the fruit drink includes yogurt or ice cream, it is termed a smoothie. A smoothie is non-carbonated and generally contains fruit or a mixture of different fruits that are pulverized to almost a liquid form which is served at a freezing temperature to include ice crystals. At times, a smoothie may also include powdery supplements. For purposes of this invention, the term smoothie is to refer to any non-carbonated fruit or fruit juice beverage that includes ice crystals. The normal method of preparing a smoothee is to place the ingredients within a blender and blend the ingredients for a few seconds which results in the ice being pulverized and evenly dispersed throughout the ingredients. The blended ingredients are then poured into consuming containers, such as a glass or cup, and the contents then consumed by the consumer.

Prior to the present invention, it has not been known to utilize any form of self-dispensing apparatus for a smoothie beverage. One reason why such a dispensing apparatus has not been known is that the overall temperature of the beverage container must be less than thirty-two degrees Fahrenheit in order to form ice crystals within the beverage. Normal dispensing machines lower the temperatures of the carbonated beverages to between thirty-five and forty-five degrees Fahrenheit which is above the freezing temperature of thirty-two degrees. In order for a smoothie to contain ice crystals, the smoothie must be at a temperature below thirty-two degrees Fahrenheit. Secondly, the dispensed smoothie beverage must be shaken in order to evenly disperse the ingredients and especially evenly disperse the ice crystals within the beverage. In a normal dispensing machine for carbonated beverages, it would be absolutely the worst thing to do to cause shaking of the beverage for the reason that as soon as the beverage container was dispensed and opened, it would literally explode.

SUMMARY OF THE INVENTION

A smoothie dispensing machine and method of dispensing of an individual beverage container which contains a smoothie beverage. The dispensing machine utilizes an enclosed housing within which is located several different types of smoothees with each type of smoothie having a plurality of individual containers. Upon selection of the particular type of smoothie by the consumer, one of the particular type of beverage containers is to be deposited within a collection chamber. Initially, the beverage containers within the dispensing machine are lowered to a temperature to between thirty-five to forty-five degrees Fahrenheit. Within the collection chamber, the beverage container is further cooled to a temperature less than thirty-two degrees Fahrenheit to approximately thirty degrees Fahrenheit. At the same time the beverage container is being cooled within the collection chamber, the collection chamber and beverage container is being rapidly shaken so that the contents of the smoothie within the beverage container are evenly mixed and evenly dispersed at the same time as ice crystals are being formed within the smoothee. This cooling and shaking will occur for a period of time which is normally about thirty seconds after which the beverage container is dispensed to a location accessible exteriorly of the dispensing machine permitting the beverage container to be manually removed from the dispensing machine and opened in order to consume the contents.

The primary objective of the present invention is to construct a machine that dispenses smoothie beverages.

Another objective of the present invention is to design a method of dispensing for a smoothie beverage.

Another objective of the present invention is to construct a machine which is capable of dispensing a smoothie beverage within an individual beverage container and when the beverage is consumed it resembles a beverage that is produced by means of a conventional blender.

DETAILED DESCRIPTION OF THE PREFERRED EMBODIMENT

Figure 1:
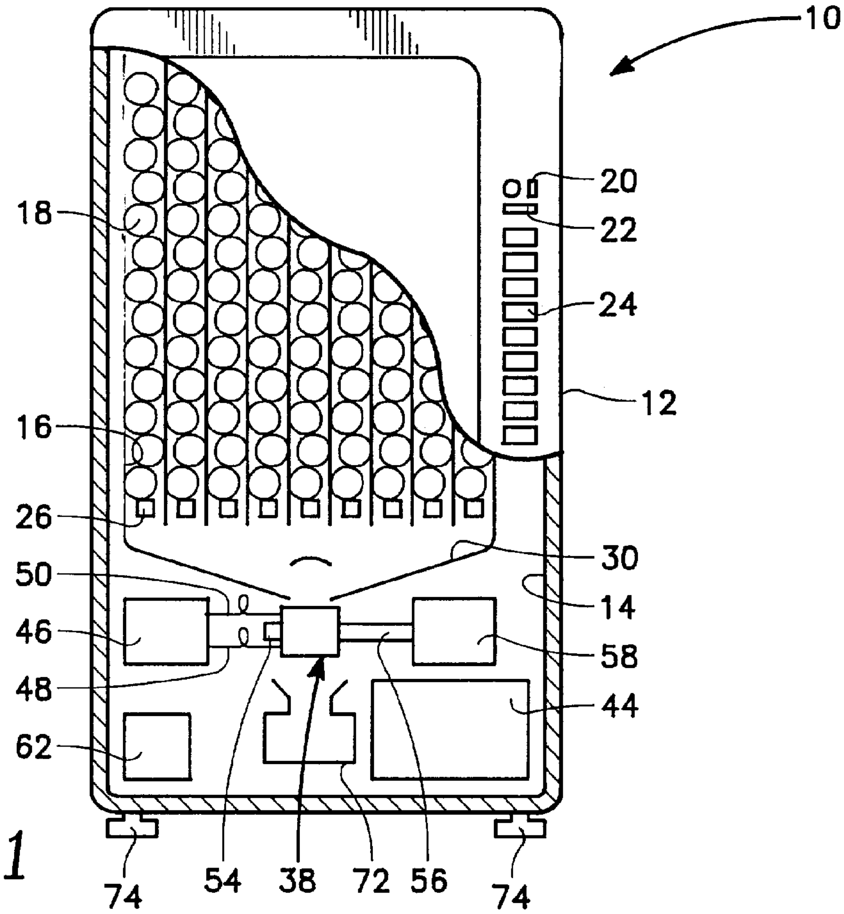
FIG. 1 is a front elevational view of the smoothie dispensing machine of the present invention which is partially cut away to show the internal components of the machine.

Referring particularly to the drawings, there is shown the dispensing machine 10 of this invention. The dispensing machine 10 utilizes an enclosed housing 12 which contains an internal chamber 14. Within the internal chamber 14 is located a series of columns 16. Within the machine 10 there is shown nine in number of the columns 16. Each column 16 is to contain a stacked series of beverage containers 18. A typical beverage container would be a can or a bottle. It is to be understood that the beverage containers 18 are sealed so as to be tightly closed when contained within the machine 10.

A consumer is to place either coins within coin slot 20 or paper money within slot 22 of the necessary denomination and push one of the nine buttons 24 that are mounted on the housing 12. It is to be understood that each button 24 is to represent a different type of smoothie beverage with it being understood that there will be nine in number of different types of smoothie beverages. Typical smoothees would be a strawberry smoothie, a blueberry smoothie, a raspberry smoothie, a boysenberry smoothie, etc. It is also considered to be within the scope of this invention that a lesser number of smoothie beverages or a greater number of smoothie beverages could be included within the machine 10.

Figure 2:
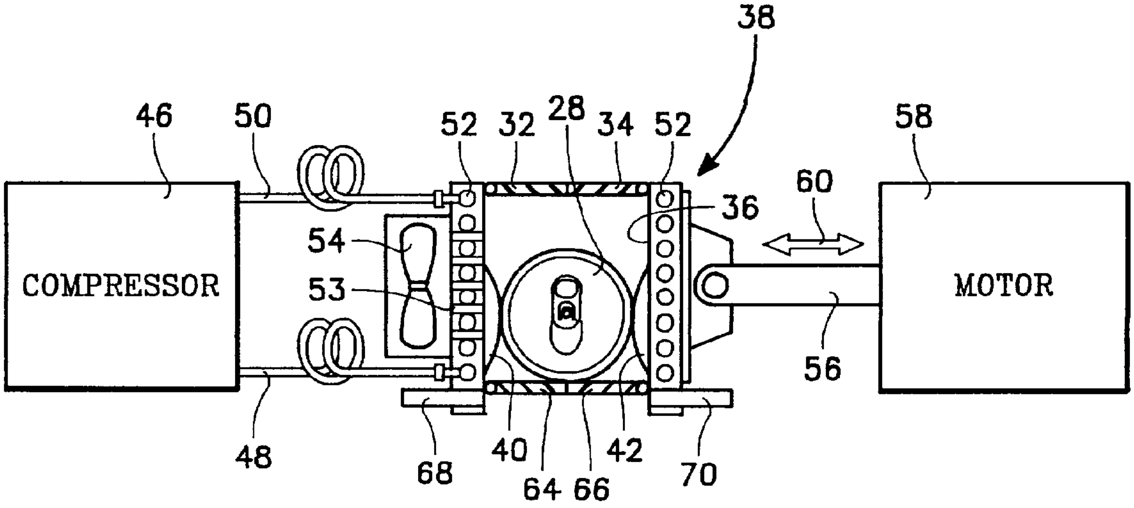
FIG. 2 is an enlarged view which schematically shows the collection chamber within the dispensing machine showing the collection chamber containing a single beverage container.
Figure 3:
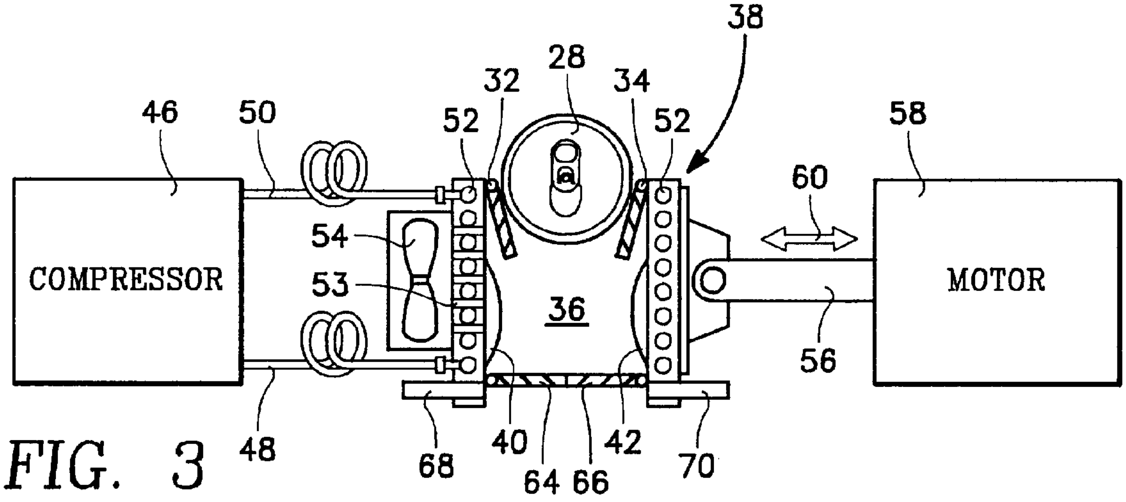
FIG. 3 is a view similar to FIG. 2 but showing the dispensing procedure for dispensing of a single beverage container into the collection chamber.
Figure 4:
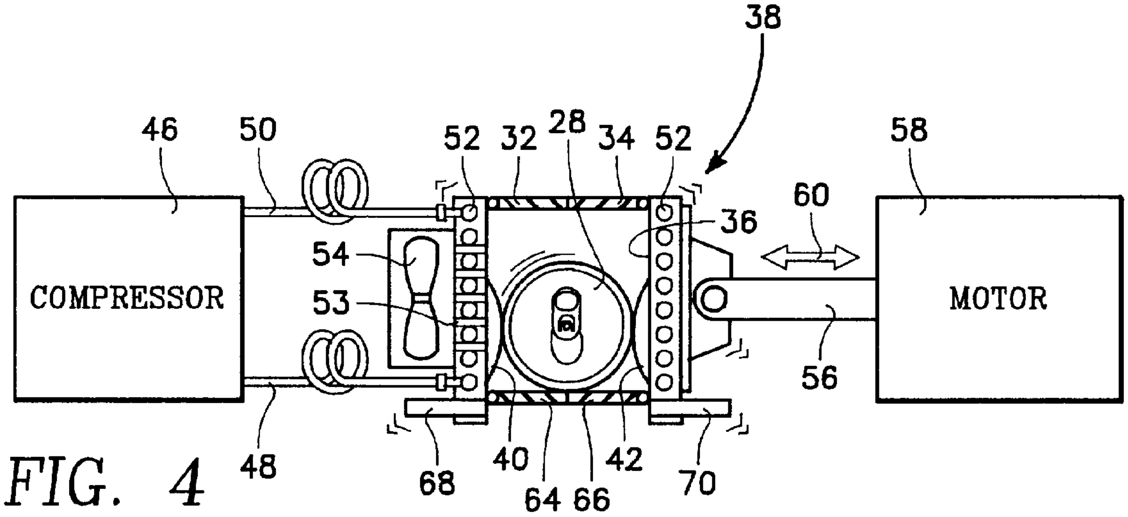
FIG. 4 is a view similar to FIG. 2 but depicting the shaking procedure for the beverage container.
Figure 5:
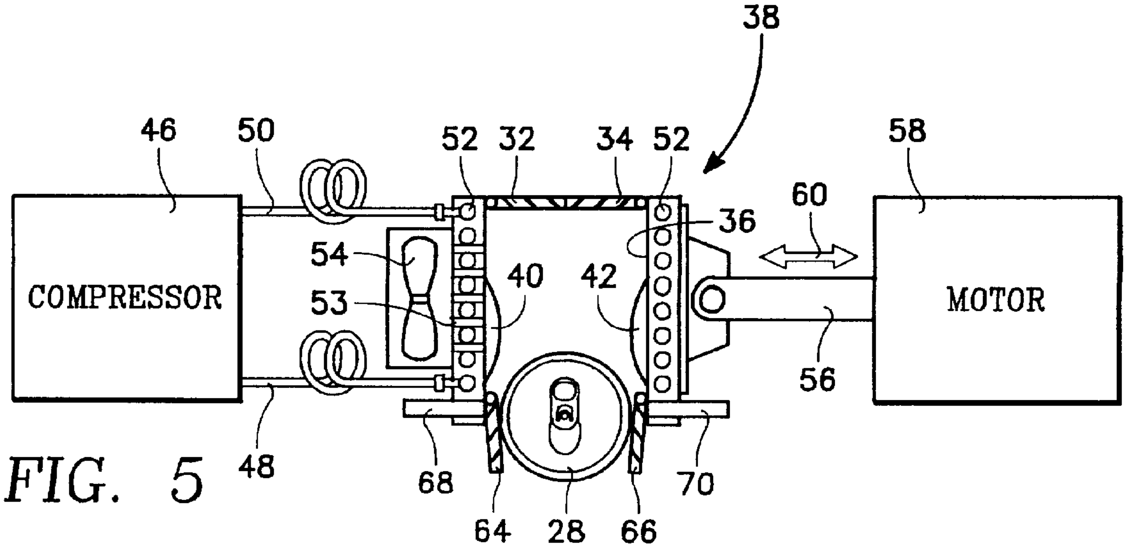
FIG. 5 is a view similar to FIG. 2 but showing the beverage container being dispensed from the collection chamber.

Upon selecting of the particular type of smoothee beverage by pressing of the appropriate button 24, a lever 26 is actuated which will cause the lowermost beverage container 18 in the selected stack of beverage containers 18 to be released. The dispensed beverage container 28 is then dropped within funnelling channel 30 in contact with entry door panels 32 and 34 which immediately deflect permitting the dispensed beverage container 28 to be deposited within the collection chamber 36 of a collection chamber housing 38. The dispensed beverage container 28 is mounted between protruding sidewalls 40 and 42 that are located within the collection chamber 36. The beverage container 28, after it passes through the entry door panels 32 and 34, such will then automatically close to the closed position shown in FIG. 2. It is to be understood that the panels 32 and 34 will be spring biased so as to automatically move to the closed position. The protruding sidewalls 40 and 42 will function to just closely confine the dispensed beverage container 28 but not snugly or fixedly secure the beverage container within the beverage container 28 within the collection chamber 36.

Mounted within the internal chamber 14 of the enclosed housing 12 is a main refrigeration unit 44. The unit 44 is to be electrically operated and is deemed to be of conventional construction and is to function to lower the temperature of the stacked series of beverage containers 18 to a temperature somewhere in the range of thirty-three to forty-five degrees Fahrenheit. Also contained within the internal chamber 14 is a secondary refrigeration unit 46. The secondary refrigeration unit 46 is connected by flexible coils 48 and 50 to the collection chamber housing 38. Coolant, such as Freon, is to be conducted through the coils 48 and 50 within passages 52 formed within the collection chamber housing 38. The coolant passing through the passages 52 will function to "super cool" the collection chamber 36 and therefore to rapidly cool the dispensed beverage container 28 to a temperature less than thirty-two degrees Fahrenheit. Normally the selected temperature will be to at least thirty degrees Fahrenheit and possible to twenty-eight degrees Fahrenheit. To facilitate the cooling within the collection chamber 36, there will normally be an electrically operated fan 54 associated with the passages 52 which will function to force cooled air within the collection chamber 36.

The collection chamber housing 38 is also fixedly mounted to a link 56. The link 56 is connected to a vibration or shaking unit 58. The vibration or shaking unit 58 is to include an electrically operated motor which is to function to move the link 56 rapidly lineally in the directions of arrow 60. It is to be understood that this movement 60 will be reciprocating. The result will be that the dispensed beverage container 28 will be rapidly shaken so that the smoothee contents contained therein will be evenly dispersed with ice crystals being caused to form therein due to the rapid cooling caused by the secondary refrigeration unit 46. This cooling and refrigeration of the dispensed beverage container 28 will normally proceed for a set period of time, such as about thirty seconds to one minute.

After the expiration of the set period of time, the electronics 62 of the dispensing machine 10 will cause the panels 64 and 66 of the exit door to be opened. Opening of panel 64 will be caused by solenoid 68. Opening of panel 66 will be caused by operation of solenoid 70. The result will be that the dispensed beverage container 28 will fall free of the collection chamber 36 into a collection trough 72. After exit of the beverage container 28 from the collection chamber 36, the panels 64 and 66 will then automatically move to the closed position shown in FIG. 2. The consumer is to have access to the collection trough 72 to affect removal of the dispensed beverage container 28, unseal the beverage container 28 and consume the contents. It is to be understood that operation of the shaking unit 58 will cease immediately prior to activation of the panels 64 and 66 which cause the container 28 to be dispensed into the trough 72.

The enclosed housing 12 is to have a plurality of feet which are to be placed onto a supporting surface, which is not shown.

What is claimed is:

1. A smoothie dispensing machine comprising:

an enclosed housing which has an internal chamber, a quantity of sealed smoothie containing beverage containers being located within said internal chamber;

a first dispensing means for dispensing a single said container into a collection chamber;

cooling means connected to said collection chamber for lowering the temperature of said single said container to less than thirty-two degrees Fahrenheit;

shaking means connected to said collection chamber for shaking of said single said container for a period of time;

a second dispensing means connected to said connection chamber for dispensing of said single said container to a location which is manually accessible exteriorly of said housing for removing of said single container to an exterior location of said housing; and whereby a user is to unseal said single said container and consume the beverage in the form of a smoothie contained therein.

2. The smoothie dispensing machine as defined in claim 1 wherein:

said housing including a main refrigeration unit for lowering the temperature of said quantity of sealed smoothie containing beverage containers to a temperature above thirty-two degrees fahrenheit.

3. The smoothie dispensing machine as defined in claim 1 wherein:

said first dispensing means including an entry door formed within said collection chamber, said single said container to be conducted through said entry door into said collection chamber during operation of said first dispensing means.

4. The smoothie dispensing machine as defined in claim 1 wherein:

said cooling means comprising a second refrigeration unit including a plurality of refrigerating coils surrounding of said collection chamber.

5. The smoothie dispensing machine as defined in claim 1 wherein:

said period of time being approximately thirty seconds.

6. The smoothie dispensing machine as defined in claim 3 wherein:

said collection chamber having an exit door, said exit door being operated as part of said second dispensing means in order to discharge said single said container from said collection chamber.

7. The method of dispensing a beverage container which contains a beverage known as a smoothie from a refrigerated dispensing apparatus comprising the steps of:

selecting by a consumer of a type of said smoothie to be dispensed;

causing said beverage container of said selected type to be dispensed into a collection chamber;

applying of a cooling environment to said collection chamber causing said beverage container to be cooled to less than thirty-two degrees fahrenheit;

shaking of said beverage container located within said collection chamber for a set period of time; and dispensing of said beverage container to a location accessible by a consumer exteriorly of said dispensing apparatus permitting said beverage container to be manually removed from said dispensing apparatus and opened by the consumer in order to consume said smoothie.

8. The method as defined in claim 7 wherein the shaking step is performed for approximately thirty seconds.

9. A smoothie dispensing machine comprising:

an enclosed housing which has an internal chamber, a quantity of sealed smoothie containing beverage containers being located within said internal chamber;

a first cooling means contained within said enclosed housing, said first cooling means to lower the temperature of said quantity of sealed smoothie containing beverage containers to a temperature above thirty-two degrees Fahrenheit;

a first dispensing means for dispensing a single said container into a collection chamber;

second cooling means connected to said collection chamber for lowering the temperature of said single said container to less than thirty-two degrees Fahrenheit;

a second dispensing means connected to said connection chamber for dispensing of said single said container to a location which is manually accessible exteriorly of said housing for removing of said single container to an exterior location of said housing; and whereby a user is to unseal said single said container and consume the beverage in the form of a smoothie contained therein.

10. The smoothie dispensing machine as defined in claim 9 wherein:

said second cooling means being separate from said first cooling means.

11. The smoothie dispensing machine as defined in claim 10 wherein:

said second cooling means comprising a refrigeration unit including a plurality of refrigerating coils surrounding of said collection chamber.

* * * * *